United States Patent [19]
Uthe

[11] Patent Number: 5,829,519
[45] Date of Patent: Nov. 3, 1998

[54] SUBTERRANEAN ANTENNA COOLING SYSTEM

[75] Inventor: Michael Uthe, Corcoran, Minn.

[73] Assignee: Enhanced Energy, Inc., Minnetonka, Minn.

[21] Appl. No.: 814,117

[22] Filed: Mar. 10, 1997

[51] Int. Cl.$^6$ ............................... B09C 1/06; C02F 1/02; E21B 36/00; E21B 43/25

[52] U.S. Cl. .............................. 166/60; 166/66; 166/248; 166/302; 210/170; 392/302; 405/131

[58] Field of Search ............................... 166/60, 65.1, 66, 166/248, 250.01; 210/170, 749; 392/301, 302; 405/128, 131

[56] References Cited

U.S. PATENT DOCUMENTS

| | | |
|---|---|---|
| Re. 30,378 | 8/1980 | Bridges et al. . |
| 2,634,961 | 6/1953 | Ljungstrom . |
| 3,170,519 | 2/1965 | Haagensen . |
| 3,230,957 | 1/1966 | Seifert . |
| 3,800,802 | 4/1974 | Berry et al. . |
| 3,803,616 | 4/1974 | Kopf et al. . |
| 3,810,186 | 5/1974 | Nakahara et al. . |
| 3,848,671 | 11/1974 | Kern . |
| 3,880,236 | 4/1975 | Durning et al. . |
| 4,008,765 | 2/1977 | Anderson et al. . |
| 4,138,188 | 2/1979 | Shannon . |
| 4,140,179 | 2/1979 | Kasevich et al. . |
| 4,140,180 | 2/1979 | Bridges et al. . |
| 4,193,451 | 3/1980 | Dauphine . |
| 4,204,549 | 5/1980 | Paglione . |
| 4,240,445 | 12/1980 | Iskander et al. . |
| 4,271,848 | 6/1981 | Turner et al. . |
| 4,301,865 | 11/1981 | Kasevich et al. ........................ 166/248 |
| 4,341,227 | 7/1982 | Turner . |
| 4,345,370 | 8/1982 | Cartier et al. . |
| 4,358,764 | 11/1982 | Cheal et al. . |
| 4,372,458 | 2/1983 | Komada . |
| 4,398,597 | 8/1983 | Haberman . |

(List continued on next page.)

FOREIGN PATENT DOCUMENTS

| | | |
|---|---|---|
| 1199106 | 1/1986 | Canada . |
| 0105677 | 4/1984 | European Pat. Off. . |
| 1188490 | 4/1970 | United Kingdom . |

OTHER PUBLICATIONS

U.S. Dept. of Commerce, "Electro–Kinetics," in Technologies of Delivery or Recovery for Remediation of Hazardous Waste Sites, pp. 25–30, University of Cincinnati, OH, Jan. 1990.

U.S. Dept. of Commerce, "Vapor Extraction," in Technologies of Delivery or Recovery for the Remediation of Hazardous Waste Sites, pp. 44–45, Univ. of Cincinnati, OH Jan. 1990.

Anderson, I. "Steam Cleaning Deals with Toxic Waste," New Scientist, p. 31, Nov. 1988.

(List continued on next page.)

*Primary Examiner*—George A. Suchfield
*Attorney, Agent, or Firm*—Fredrikson & Byron, PA

[57] ABSTRACT

The present invention provides a system for cooling antenna assemblies, such as subterranean RF antennas used to heat geological formations. The invention generally includes a radio frequency (RF) generator, a waveguide operatively connected to the RF generator and to the antenna, a supply of cooling gas and a cooling gas delivery tube. In one embodiment, a housing encloses the antenna, with the antenna and the waveguide defining a gas enclosure. The supply of cooling gas in this embodiment includes a regulated gas supply, a desiccator and a heat exchanger through which the gas passes. The cooling gas delivery tube is in fluid communication with the supply of cooling gas and extends downwardly within the gas enclosure to deliver cooled, dried gas to the gas enclosure. An alternative embodiment employs a coaxial transmission line as the waveguide, with the coaxial line having an inner tubular member received within a lumen of an outer tubular member. The cooling gas delivery tube in this embodiment extends along a length of a lumen of the inner tubular member and may have a diffuser carried adjacent its distal end for delivering a supply of cooling gas to the lumen of the inner tubular member.

23 Claims, 1 Drawing Sheet

U.S. PATENT DOCUMENTS

| | | |
|---|---|---|
| 4,403,618 | 9/1983 | Turner et al. . |
| 4,449,585 | 5/1984 | Bridges et al. . |
| 4,457,365 | 7/1984 | Kasevich et al. ............................ 166/60 |
| 4,485,868 | 12/1984 | Sresty et al. . |
| 4,485,869 | 12/1984 | Sresty et al. . |
| 4,508,168 | 4/1985 | Heeren . |
| 4,524,827 | 6/1985 | Bridges et al. . |
| 4,545,435 | 10/1985 | Bridges et al. . |
| 4,553,592 | 11/1985 | Looney et al. . |
| 4,583,556 | 4/1986 | Hines et al. . |
| 4,583,589 | 4/1986 | Kasevich . |
| 4,612,940 | 9/1986 | Kasevich et al. . |
| 4,620,593 | 11/1986 | Haagensen . |
| 4,638,862 | 1/1987 | Savage . |
| 4,654,004 | 3/1987 | Bridges et al. . |
| 4,658,836 | 4/1987 | Turner . |
| 4,660,007 | 4/1987 | Edwards et al. . |
| 4,662,383 | 5/1987 | Sogawa et al. . |
| 4,670,634 | 6/1987 | Bridges et al. . |
| 4,700,716 | 10/1987 | Kasevich et al. . |
| 4,705,108 | 11/1987 | Little et al. . |
| 4,765,902 | 8/1988 | Ely et al. . |
| 4,776,086 | 10/1988 | Kasevich et al. . |
| 4,805,698 | 2/1989 | Baugh et al. . |
| 5,018,576 | 5/1991 | Udell et al. . |
| 5,055,180 | 10/1991 | Klaila .................................. 166/248 X |
| 5,065,819 | 11/1991 | Kasevich . |
| 5,299,887 | 4/1994 | Ensley ..................................... 405/128 |
| 5,420,402 | 5/1995 | Bridges et al. ..................... 166/248 X |
| 5,512,341 | 4/1996 | Kasevich . |
| 5,539,853 | 7/1996 | Jamaluddin et al. . |

OTHER PUBLICATIONS

Oma, K.H. et al., "In Situ Heating to Detoxify Organic–Contaminated Soils," Hazardous Material Control, pp. 14–19, Mar./Apr. 1989.

U.S. Dept. of Commerce, "Readio–Frequency Heating," in Technologies of Delivery or Recovery for the Remediation of Hazardous Waste Sites, pp. 66–67, University of Cincinnati, OH, Jan. 1990.

SUBTERRANEAN ANTENNA COOLING SYSTEM

FIELD OF THE INVENTION

The present invention generally relates to a system and method for cooling antennas, and has particular utility in cooling microwave antennas used for subterranean heating.

BACKGROUND OF THE INVENTION

Efforts to remove underground hydrocarbons (e.g., petroleum products) from such media as oil shale, tar sand, and ground water contamination have utilized a variety of techniques. It has long been known that heating the petroleum-bearing formation reduces viscosity of the petroleum products and allows them to be removed more readily. A number of techniques for heating the underground petroleum products have been proposed. For example, some have proposed deploying electrodes into the ground and simply heating the formation through resistance heating while others have proposed delivering steam to the formation or generating steam in-situ.

One technique gaining popularity in these fields utilizes microwave energy to heat the surrounding media. Numerous systems have been developed to efficiently deliver this electromagnetic energy to the desired location. For example, U.S. Pat. No. 4,620,593 (Haagensen), the teachings of which are incorporated herein by reference, shows a microwave antenna system which can be used to heat oil-bearing earth formations. Other subterranean microwave antennas are shown in U.S. Pat. Nos. 4,508,168 (Heeren) and 4,583,589 (Kasevich), the teachings of which are also incorporated herein by reference.

In general, subterranean microwave heating systems employ an elongate antenna which is located below ground level at the site where heating is desired. This antenna is typically received within a borehole and a coaxial transmission line attaches the antenna to a radio frequency (RF) generator. The RF generator is typically a magnetron or klystron generator. The coaxial transmission line serves as a waveguide to transmit this signal to the distally located antenna which, in turn, radiates RF energy (typically microwave energy) to the surrounding soil or other media.

This transmitted RF energy heats fluids in the media, including petroleum products or other hydrocarbons contained therein, reducing the viscosity of such hydrocarbons. This has at least two advantages: 1) it helps the petroleum products flow more readily and reduces pumping power necessary to withdraw the petroleum, and 2) it increases the relative mobility of the petroleum products in the media as compared to the mobility of water in the media, reducing the amount of water withdrawn during pumping. In situations where one is removing petroleum products from a large petroleum reserve, the advantages are obvious. If the petroleum products are present in smaller quantities, e.g. where petroleum products contaminate ground water and merely define a layer on top of the water table, the advantages may be less obvious, but are frequently at least as pronounced.

Generating RF energy not only heats the surrounding media, but can also generate excessive heat in the antenna structure itself. This excessive heat can reduce the efficiency of the system, risk damaging the antenna structure, and increase the possibility of igniting flammable components of the petroleum products present in the borehole. Some people have proposed pressurizing the antenna structure with an inert gas. For example, Kasevich's U.S. Pat. No. 4,583,589, mentioned above, suggests pressurizing the RF transmission line and the entire well casing with an inert gas. Heeren's U.S. Pat. No. 4,508,168 suggests using a supply of nitrogen primarily to pressurize the system and push kerogen up the production tube for removal.

SUMMARY OF THE INVENTION

The present invention provides an antenna cooling system for cooling an antenna positioned within an underground bore hole. In one embodiment, an antenna cooling system of the invention includes a radio frequency generator and a coaxial transmission line operatively connected to the radio frequency generator and to the antenna. This coaxial transmission line desirably has an inner tubular member received within a lumen of an outer tubular member. A supply of a cooling gas is provided, and a cooling gas delivery tube is in fluid communication with the supply of cooling gas and extends along a length of a lumen of the inner tubular member. In this embodiment, a diffuser is carried adjacent a distal end of the cooling gas delivery tube for delivering a supply of cooling gas to the lumen of the inner tubular member. The system can also include any number of additional improvements, such as a heat exchanger for cooling the cooling gas before delivery to the cooling gas delivery tube or one or more spacers spacing the cooling gas delivery tube from an inner surface of the inner tube.

An alternative embodiment of the invention also provides an antenna cooling system for cooling an antenna positioned within an underground bore hole and a radio frequency generator. In this embodiment, though, the system includes a waveguide operatively connected to the radio frequency generator and to the antenna and a housing encloses the antenna so the antenna and the waveguide define a gas enclosure. A supply of a cooling gas includes a regulated gas supply, a desiccant, and a heat exchanger through which the gas passes. A cooling gas delivery tube is in fluid communication with the supply of cooling gas and extends downwardly within the gas enclosure to deliver cooled, dried gas to the gas enclosure. If so desired, the waveguide may comprise a coaxial transmission line.

DETAILED DESCRIPTION OF PREFERRED EMBODIMENTS

Figure 1:
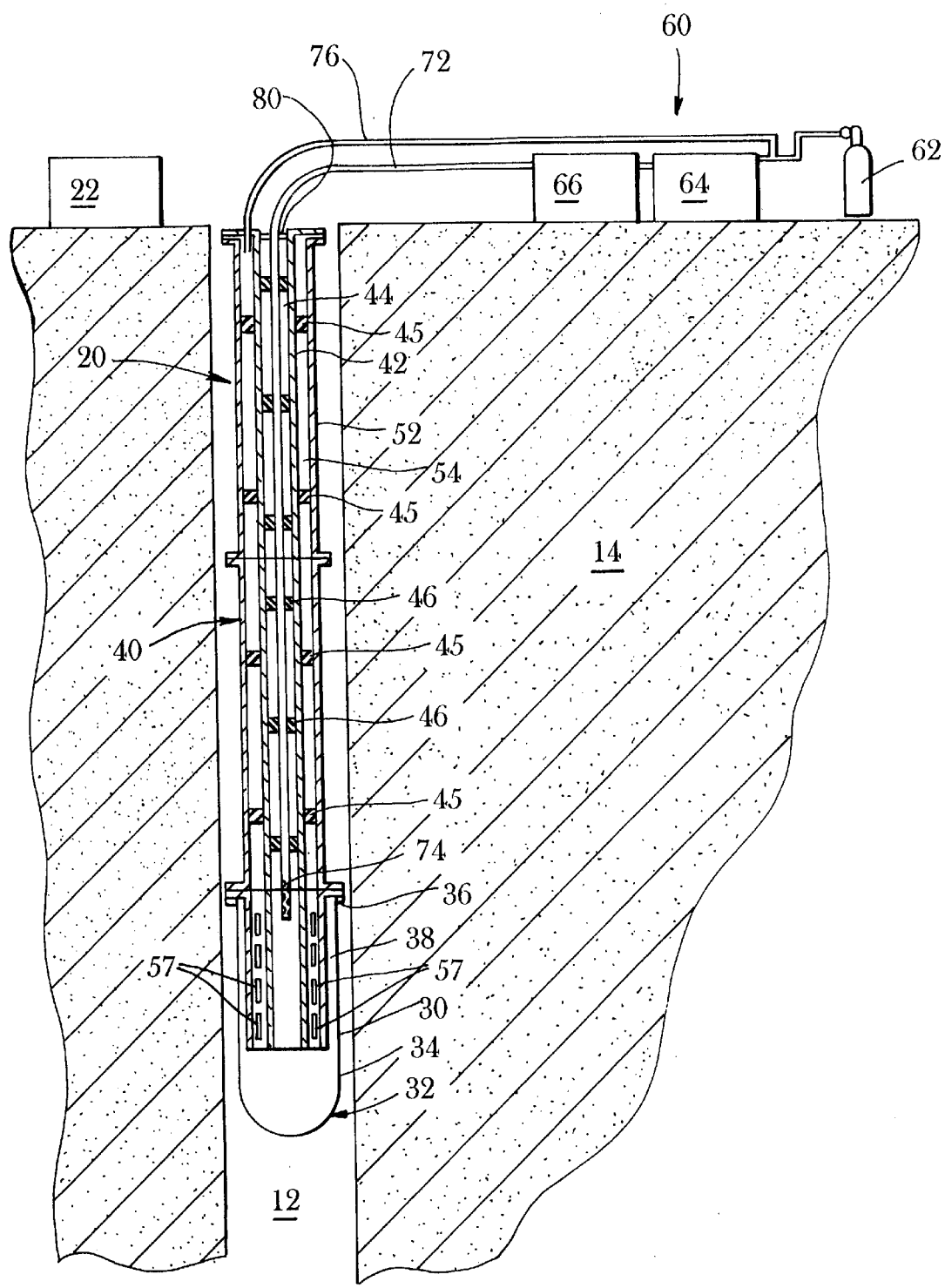
FIG. 1 is a schematic illustration of an antenna and antenna cooling system in keeping with the present invention.

FIG. 1 schematically illustrates one embodiment of an antenna cooling system 10 of the invention. A bore hole 12 extends downwardly into a geological formation 14 in the earth and an antenna assembly 20 extends downwardly within the bore hole 12. The bore hole obviously will be located to access the formation 14 to be heated with the antenna. For example, if the antenna is to be used to remove hydrocarbons from a geological formation, the bore hole should extend downwardly through the overburden to a location positioned within the "Pay zone" of the hydrocarbon-bearing formation. If the system is instead to be used to remediate contaminated groundwater, the borehole would extend downwardly to a level adjacent, and preferably significantly below, the level of the water table at a location within the plume of contaminated water.

The antenna assembly 20 should be sized to be received within the bore hole 12. If so desired, the inner diameter of the bore hole can be close to the outer diameter of the antenna assembly, but that is not necessary to practice this invention. The selection of the proper location and relative size of the bore hole with respect to the antenna is well within the skill of those practicing in this area and need not be discussed in any detail here.

As illustrated by the differences between the various RF heating antennas shown in the Haagensen, Heeren and Kasevich patents, the structure of the antenna assembly 20 can vary depending on the application for which it is to be used and the relative priorities of various design objectives such as ease of use, efficiency, safety, etc. Generally speaking, though, an antenna assembly suitable for RF heating of a geological formation will include an RF generator 22, an antenna 30, and a waveguide 40. In use, the antenna is positioned below ground level within the bore hole 12 at a location adjacent the section of the geological formation 14 the user desires to heat. The RF generator is most commonly positioned on the ground adjacent the bore hole rather than within the bore hole itself.

The waveguide 40 is operatively connected to the RF generator 22 and to the antenna 30 and serves to transmit the RF waves produced by the generator down to the antenna. The antenna then radiates the RF waves into the surrounding media, heating the media and any petroleum products contained therein. The details of the structure of suitable antennas are discussed at length in the literature in this field and are beyond the scope of this disclosure. The three references mentioned and incorporated by reference above provide a number of designs suitable for use in connection with the present invention, though.

Some antenna designs in the prior art are not enclosed, i.e. gas or other fluid within the antenna is free to communicate with the environment within the bore hole. In the present invention, though, the antenna is desirably enclosed within an antenna housing 32. This housing should be transmissive of microwaves or other RF waves being generated by the antenna to heat the geological formation. Suitable materials noted in the art include fiberglass, teflon, low dielectric ceramics and polyethylene. The housing 32 may generally include an elongate dome-shaped body 34 sized to receive the transmitting element 38 of the antenna therein with adequate clearance and a mounting flange 36 or other structure allowing the housing 32 to be attached to other elements of the antenna assembly 20, as discussed below. The housing 32 is desirably generally impermeable to fluids, i.e. the flow of gas or liquid through the wall of the housing is relatively inconsequential, but small amounts of fluid may pass through the housing or its fitting. Ideally, though, the housing is substantially fluid-tight and approaches a hermetic seal to minimize ingress of potentially explosive gases from the bore hole into the housing.

The waveguide 40 is formed of a material which can efficiently transmit the RF waves and which can withstand the rigors of the environment in which the antenna assembly will be used. Typically, these waveguides are formed of metal, preferably metals such as copper, stainless steel or aluminum. Waveguides can have differing shapes depending on the intended use of the antenna assembly. For example, Haagensen proposes one design for shorter lengths, while a somewhat more complex shape is disclosed for use in longer lengths where transmission losses are more critical. In accordance with one embodiment of the present invention, a waveguide 40 can have virtually any construction which serves to transmit the RF signal from the generator to the antenna 30.

In another embodiment of the invention, though, the waveguide 40 is a coaxial transmission line. In particular, the coaxial transmission line comprises an inner tubular member 42 and an outer tubular member 52, each of which is generally hollow and includes a lumen (44 and 54, respectively). The inner tubular member 42 is received within the lumen 54 of the outer tubular member 52 and extends along at least a portion of the length of the outer tubular member. These tubular members are shown as being generally cylindrical and having a circular cross section. In one suitable embodiment, the inner tubular member can comprise a copper pipe having an inner diameter of about 1.5 inches (about 3.8 cm) and an outer diameter of about 1.75 inches (about 4.45 cm) while the outer tubular member has an inner diameter of about 4.06 inches (about 10.31 cm) and an outer diameter of about 4.3 inches (about 10.9 cm). Although a cylindrical shape is generally preferred, it should be understood that these tubular members could have different shapes, such as oval or rectangular cross sections.

The inner and outer tubular members 42, 52 should be spaced from one another along their lengths to improve efficiency of the system and reduce the chance of arcing within the waveguide 40. Ideally, the respective axes of the inner and outer tubular members generally coincide with one another, but the term "coaxial" is not limited to such an alignment of these two parts of the waveguide 40. It is simply advantageous to keep the two tubular members spaced from one another.

This spacing may be accomplished by placing suitable spacers 45 between the inner surface of the outer tubular member and the outer surface of the inner tubular member. Although a single spacer could be used, a number of spacers are desirably spaced along the length of the waveguide 40. The spacers are optimally formed of an electrically insulative material, e.g. ceramic or polytetrafluoroethylene. For reasons explained more fully below, the spacers do not occlude the entire annular space between the inner and outer tubular members so that fluid may flow in that annular space.

The waveguide is desirably attached to the housing 32 of the antenna in a generally fluid-tight seal. This will help retain cooling gas within the gas enclosure defined by the waveguide 40 and antenna housing 32, as discussed in more detail below. Since a positive relative pressure of gas ideally is maintained in this gas enclosure, such a tight seal may not be truly necessary, but gas within the bore hole 12 is desirably kept out of the gas enclosure to keep it from coming into contact with the transmitting element 38 of the antenna. So isolating the transmitting element helps minimize the chances of exploding any flammable gases which may be present in the bore hole. If so desired, the upper ends of the inner and outer tubular members may be attached to one another to generally seal this enclosure at the upper end of the waveguide, too.

The transmitting element 38 of the antenna can be of any desired design. In the illustrated embodiment, this transmitting element comprises an extension of the inner and outer tubular members 42, 52 into the antenna housing 32. As is known in the art, the outer tubular member 52 may include resonance slots 57 cut into a distal length to amplify the RF signal at selected wavelengths. This design is schematically shown just for purposes of illustration; any other appropriate configuration which will transmit the desired wavelength could be substituted.

The inner and outer tubular members 42, 52 can each comprise a single piece of tubing having the desired length. For ease of use and greater flexibility from site to site, though, it is preferred that each of these members 42, 52 be formed from a plurality of segments joined end-to-end. In the embodiment shown in the drawings, the outer tubular member 52 is shown as being formed of two separate lengths, with the distal end of the lower segment being attached to the antenna housing. One could, of course, have any suitable number of segments. Particularly in deeper bore holes, one will likely have more than two segments. The inner tubular member is shown as being formed of a single length of tubing solely for greater clarity in the drawing; the inner tubular member 42 will usually be formed of the same number of elements as is the outer tubular member 52.

If one or both of the inner tubular members are formed of multiple segments, the segments are ideally joined to one another in a generally sealing fashion. This will help maintain the integrity of the gas enclosure mentioned above, but is likely not very critical. As noted in connection with the seal of the antenna housing 32 to the waveguide 40, the seal between segments of the inner or outer tubular members can allow fluid to flow therethrough, particularly if a positive pressure is maintained in the enclosure.

As mentioned before, a supply of a cooling gas is provided. This supply 60 could, in theory, comprise a mere compressor or the like to deliver ambient air to the gas enclosure. This, however, is unlikely to provide the desired degree of cooling without very high flow rates. In addition, ambient air includes moisture and delivering moisture to the antenna system, as detailed below, could reduce efficiency of the system and, over time, could promote sufficient oxidation to cause permanent damage to the waveguide or antenna's transmitting element.

In one preferred embodiment of the invention, the supply of cooling gas includes a regulated gas supply 62, a desiccator 64, and a heat exchanger 66 through which the gas passes. The regulated gas supply is schematically illustrated in FIG. 1 as a pressurized tank of gas with a regulator attached. Any suitable source of pressurized gas which can be delivered at a controlled rate will suffice, though. For example, if air is to be used as the cooling gas, the regulated gas supply 62 may simply comprise a standard air compressor. The flow rate and/or temperature of cooling gas should be regulated to provide the desired degree of cooling of the antenna apparatus.

The temperature of the gas being supplied, the flow rate of that gas, the heat generated by the antenna apparatus, and the heat capacity of the gas used will all affect the temperature of the antenna apparatus, so no firm guidelines can be give for appropriate flow rates or operating pressures. For example, one can maintain a constant flow of nitrogen through the system of the invention, adjusting the temperature of that nitrogen to keep the antenna apparatus at the desired working temperature.

In a preferred embodiment, the cooling gas is not mere air, though. Instead, an "inert" gas, i.e. a gas which will help suppress the likelihood of an explosion, is used. For example, various anaerobic gases such as $CO_2$ or nitrogen can be used to good effect. Not only will this cool the antenna assembly, but it will also limit available oxygen and, hence, the likelihood of causing an explosion in the bore hole 12. In one possible embodiment, the gas may be supplied in the form of a cold liquid (e.g., liquid nitrogen) or even a solid (e.g., frozen $CO_2$ or "dry ice"). If such a cooled gas is used, the heat exchanger may be used more to heat the cooling gas than to cool it from ambient temperature. It may even be possible to eliminate the heat exchanger altogether, mixing a supply of a very cool gas (e.g., liquid nitrogen or dry ice) with a supply of a warmer gas (e.g., pressurized tanks at close to ambient temperature) to arrive at the desired cooling gas temperature.

The temperature of the equipment located down in the bore hole can be sensed with a temperature sensor and this temperature information can be delivered to a thermostat. The thermostat can, in turn, control the flow rate of the cooling gas, the temperature of the cooling gas, or both the flow rate and temperature of the cooling gas delivered through the cooling gas delivery tube. This will help maintain the equipment within a predetermined temperature range. The optimal temperature range will likely vary depending on the materials used to construct the antenna assembly, the nature of the surrounding media, etc. and likely will need to be determined on a case-by-case basis.

The temperature sensor (not shown) can sense the temperature of the antenna assembly directly or indirectly. If direct temperature measurement is desired, the temperature sensor can be positioned adjacent the transmitting element, where the highest temperatures are likely to be encountered. Such a direct temperature measurement tends to be fairly accurate and provides immediate feedback to the thermostat, creating a fairly precise control loop. However, such a temperature sensor is subjected to fairly high temperatures, must be durable, and is essentially inaccessible during use.

Indirect temperature measurement can be accomplished, for example, by sensing the temperature of the gas being withdrawn from the gas enclosure through the gas recirculation line 76 mentioned below. This will tend to be much less accurate than measuring the temperature down within the bore hole and there can be a significant time lag between the actual effects on the equipment being cooled and the temperature of this gas where it is extracted from the enclosure. Nonetheless, such remote temperature sensing may be best in day-to-day use in the field because the sensor is subjected to less rigorous conditions and is readily accessible if there is a problem.

FIG. 1 shows the regulated gas supply 62 in fluid communication with the desiccator 64 which, in turn, is in direct communication with the heat exchanger 66. The relative order of these latter two components can be reversed, with gas flowing first to the heat exchanger and thence to the desiccator. Since the desiccator will remove water vapor, though, it is considered best to remove the moisture and cool the remaining gas rather than cooling the water vapor before removing it.

The desiccator 64 can be of any suitable design. For example, it can comprise a container with a bed of a desiccant material, such as calcium sulfate, through which the gas is forced to flow. One suitable desiccant for such a configuration is available under the trade name DRIERITE from VWR Scientific Products.

A wide variety of commercially available heat exchangers could be used as the heat exchanger 66 shown in FIG. 1. In cooler climates, one could simply use a heat sink, such as a convoluted length of tubing with fins for carrying off the heat, and passing ambient air over the heat sink. If a greater degree of cooling is required, an industrial refrigerating unit or the like may instead be employed. Alternatively, as noted above, a very cold supply of gas (e.g., liquid nitrogen or dry ice) may be employed. In such an embodiment, a heat sink could warm up the cold gas, rather than cooling it down, before delivery.

Cool, dried gas is delivered from the cooling gas supply 60 to the cooling gas delivery tube 72. The cooling gas delivery tube extends downwardly within the lumen 44 of the inner tubular member 42 of the waveguide 40. A diffuser 74 is desirably carried adjacent a distal end of the cooling gas delivery tube to ensure a diffuse flow of cooling gas within the lumen 44. This diffuser may consist of a series of baffles, but can simply comprise a series of openings along a distal length of the cooling gas delivery tube itself, allowing cooling gas to exit the hose at a lower flow rate through each of a plurality of holes in addition to or instead of the distal end of the hose. As shown, these openings can be oriented to direct cooling gas generally radially outwardly toward the inner surface of the inner tubular member 42. The precise size, shape and distribution of such orifices can be varied as deemed necessary to achieve the optimum flow rate for a specific antenna's transmitting element and prevalent operating conditions.

The cooling gas delivery tube 72 should be formed of a material capable of withstanding the rigors of the environment in which it will be used. Attention should be paid to ensure that the material will hold up well at the temperatures to which it will be exposed and the internal pressures at which the cooling gas is to be delivered. In addition, the material should not interfere with the operation of the antenna's transmitting element 38. Cooling gas delivery tubes made of copper or teflon are believed to be suitable.

The length of the cooling gas delivery tube can be varied. In one preferred embodiment, the delivery tube delivers cooling gas to the lumen 44 of the inner tubular member toward the upper end of the transmitting element. In FIG. 1, the diffuser 74 is positioned just above the top of the transmitting element. The cooled gas exiting the cooling gas delivery tube will likely be more dense than the warmer ambient gas at that point in the assembly, allowing it to flow downwardly within the lumen of the inner tubular member and into the antenna housing 32.

The cooling gas delivery tube 72 is optimally spaced from the surface of the inner tubular member 42 along its length. In order to maintain spacing between these two parts, one or more spacers can be provided along the length of the cooling gas delivery tube. As shown in FIG. 1, a plurality of spacers 46 are spaced along the length of the tube. As with the spacers 45 in the annular space between the two tubular members 42, 52, the spacers 46 holding the cooling gas delivery tube in place desirably allow gas to flow upwardly and downwardly within the lumen 44 of the inner tubular member. These spacers 46 may also be made of an electrically insulative material to maximize efficiency of the waveguide 40 and reduce arcing within the waveguide.

The gas will heat up as it passes through the transmitting element 38 and as it resides in the housing 32. This will cause it to rise within the waveguide 40, establishing a convection flow of heated gas within the waveguide. Since the cooling gas delivery tube is in the lumen 44 of the inner tubular member and gas exits flows downwardly therefrom, the majority of the heated gas will rise upwardly within the annular space between the exterior of the inner tubular member 42 and the inner surface of the outer tubular member 52.

Previously, it was noted that the spacers 45 within this annular space should not occlude the space, but should instead allow gas to flow upwardly within this annulus. This will enhance the circulation of gas within the assembly 20 and improve cooling efficiency. Using a similar construction for the spacers 46 in the lumen of the inner tubular member also allows gas to flow within that lumen, improving circulation to some extent and reducing any pressure differences along the length of the lumen 44.

As noted above, seals between some adjoining parts of the antenna assembly 20 are desirably relatively fluid tight. The seals at the joint between the housing 32 and the waveguide 40, between adjoining segments of the inner and outer tubular members 42, 52 of the waveguide and at the upper end of the waveguide are specifically mentioned above. The antenna housing 32, waveguide 40 and cap 80 form a gas enclosure within which the cooling gas can circulate.

Some positive pressure within the gas enclosure is desirable to limit the ingress of ambient air from within the bore hole 12, as noted above. This pressure should not be too high, though. In order to control this pressure and the improve circulation of gas within the enclosure, cooling gas can exit the enclosure after it has been heated and risen toward the top of the waveguide. The heated gas can simply be vented to atmosphere with little ill effect. More desirably, though, the gas is recirculated for reuse as a cooling gas, particularly when the cooling gas is a relatively expensive "inert" gas rather than mere air.

FIG. 1 shows a gas recirculation line 76 extending from the top of the waveguide 40 to the desiccator 64. The gas recirculation line 76 can pass through the cap 80 and communicate with the annular space between the inner and outer tubular members. If so desired, heated gas can be withdrawn from the gas enclosure by maintaining a pressure differential between the gas enclosure and the desiccator. This will withdraw gas from within the annulus between the tubular members, further enhancing the circulation of gas from the lumen 44 of the inner tubular member 42, into the housing 32 and upwardly between the inner and outer tubular members.

While a preferred embodiment of the present invention has been described, it should be understood that various changes, adaptations and modifications may be made therein without departing from the spirit of the invention and the scope of the appended claims.

What is claimed is:

1. An antenna cooling system for cooling an antenna assembly positioned within an underground bore hole, comprising:
   a. a radio frequency generator;
   b. a coaxial transmission line operatively connected to the radio frequency generator and to an antenna transmitting element, the coaxial transmission line having an inner tubular member received within a lumen of an outer tubular member;
   c. a supply of a cooling gas; and
   d. a cooling gas delivery tube in fluid communication with the supply of cooling gas and extending along a length of a lumen of the inner tubular member, a diffuser being carried adjacent a distal end of the cooling gas delivery tube for delivering a supply of cooling gas to the lumen of the inner tubular member.

2. The antenna cooling system of claim 1 wherein the distal end of the cooling gas delivery tube is positioned within an interior of the antenna transmitting element.

3. The antenna of claim 2 wherein the lumen of the inner tubular member is in fluid communication with the lumen of the outer tubular member, wherein cooling gas delivered to the lumen of the inner tubular member through the cooling gas delivery tube flows into the lumen of the outer tubular member.

4. The antenna cooling system of claim 1 wherein the supply of cooling gas comprises a regulated gas supply and a heat exchanger through which the gas passes before being delivered to the cooling gas delivery tube, the heat exchanger being located externally of the bore hole.

5. The antenna cooling system of claim 4 wherein the supply of cooling gas further comprises a desiccator through which the cooling gas passes before being introduced into the lumen of the inner tubular member.

6. The antenna cooling system of claim 4 wherein the regulated supply of gas comprises a pressurized supply of an inert gas.

7. The antenna cooling system of claim 1 wherein the antenna is retained in an antenna housing which encloses distal ends of the inner and outer tubular members and directs cooling gas from the lumen of the inner tubular member to the lumen of the outer tubular member.

8. The antenna cooling system of claim 1 further comprising at least one spacer spacing the cooling gas delivery tube from an inner surface of the inner tube.

9. The antenna cooling system of claim 8 wherein the spacer comprises an electrically insulative material.

10. The antenna cooling system of claim 9 wherein the spacer comprises polytetrafluoroethylene.

11. The antenna cooling system of claim 8 wherein a plurality of spacers are spaced along the length of the cooling gas delivery tube.

12. The antenna cooling system of claim 1 further comprising a temperature sensor sensing the temperature of the antenna.

13. The antenna cooling system of claim 12 wherein the temperature sensor is connected to a thermostat which controls the temperature of the cooling gas delivered to the delivery tube.

14. The antenna cooling system of claim 12 wherein the temperature sensor is connected to a thermostat which controls the flow rate of the cooling gas to the delivery tube.

15. An antenna cooling system for cooling an antenna assembly positioned within an underground bore hole, comprising:
   a. a radio frequency generator;
   b. a waveguide operatively connected to the radio frequency generator and to an antenna;
   c. a housing enclosing the antenna, the antenna and the waveguide defining a gas enclosure;
   d. a cooling gas delivery tube extending downwardly within the gas enclosure; and
   e. a supply of a cooling gas including a regulated gas supply, a desiccator, and a heat exchanger through which the gas passes; the cooling gas delivery tube being in fluid communication with the regulated gas supply and extending downwardly within the gas enclosure to deliver dried gas to the gas enclosure.

16. The antenna cooling system of claim 15 wherein the waveguide has a lumen, the cooling gas delivery tube extending along a length of that lumen.

17. The antenna cooling system of claim 16 wherein the cooling gas delivery tube includes a diffuser adjacent a distal end thereof, cooled, dried gas within the cooling gas delivery tube diffusing into the gas enclosure through the diffuser.

18. The antenna cooling system of claim 15 wherein the cooling gas delivery tube extends within the gas enclosure to a position adjacent the antenna.

19. The antenna cooling system of claim 15 wherein the waveguide comprises a coaxial transmission line having an inner tubular member and an outer tubular member, the cooling gas delivery tube extending downwardly within a lumen of the inner tubular member.

20. The antenna cooling system of claim 15 wherein the heat exchanger is located externally of the bore hole.

21. The antenna cooling system of claim 1 further comprising a temperature sensor sensing the temperature of the antenna and a thermostat which controls the temperature of the cooling gas delivered from the heat exchanger to the delivery tube.

22. The antenna cooling system of claim 1 further comprising a temperature sensor sensing the temperature of the antenna and a thermostat which controls the flow rate of the cooling gas delivered from the heat exchanger to the delivery tube.

23. An antenna cooling system for cooling an antenna positioned within an underground bore hole, comprising:
   a. a radio frequency generator;
   b. a coaxial transmission line operatively connected to the radio frequency generator and to the antenna, the coaxial transmission line having an inner tubular member received within a lumen of an outer tubular member;
   c. a supply of a cooling gas including a regulated gas supply, a desiccator, and a heat exchanger through which the gas passes before being delivered to the cooling gas delivery tube, the heat exchanger being located externally of the bore hole; and
   d. a cooling gas delivery tube in fluid communication with the supply of cooling gas and extending along a length of a lumen of the inner tubular member, a diffuser being carried adjacent a distal end of the cooling gas delivery tube for delivering a supply of cooling gas to the lumen of the inner tubular member.

* * * * *